(12) United States Patent
Kshirsagar et al.

(10) Patent No.: US 11,886,604 B2
(45) Date of Patent: *Jan. 30, 2024

(54) IMAGE CONTENT OBFUSCATION USING A NEURAL NETWORK

(71) Applicant: MICROSOFT TECHNOLOGY LICENSING, LLC, Redmond, WA (US)

(72) Inventors: Kamlesh Dattaram Kshirsagar, Stuttgart (DE); Frank T. Seide, Yarrow Point, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/126,615

(22) Filed: Mar. 27, 2023

(65) Prior Publication Data
US 2023/0237176 A1     Jul. 27, 2023

Related U.S. Application Data

(63) Continuation of application No. 16/864,465, filed on May 1, 2020, now Pat. No. 11,709,954.

(51) Int. Cl.
*G06F 21/62* (2013.01)
*G06N 20/00* (2019.01)
(Continued)

(52) U.S. Cl.
CPC ...... *G06F 21/6209* (2013.01); *G06F 18/2155* (2023.01); *G06F 18/241* (2023.01);
(Continued)

(58) Field of Classification Search
CPC ............. G06F 21/6209; G06F 18/2155; G06F 18/241; G06F 21/602; G06N 20/00;
(Continued)

(56) References Cited

U.S. PATENT DOCUMENTS 9,847,974 B2 * 12/2017 Kompalli .......... G06F 18/24133
10,747,854 B2 * 8/2020 Kim ........................ G06N 20/20
(Continued)

OTHER PUBLICATIONS

"Office Action Issued in European Patent Application No. 21151022. 7", dated Aug. 16, 2023, 3 Pages.

*Primary Examiner* — Utpal D Shah
(74) *Attorney, Agent, or Firm* — Shook, Hardy & Bacon L.L.P.

(57) ABSTRACT

The technology described herein obfuscates image content using a local neural network and a remote neural network. The local network runs on a local computer system and a remote classifier runs in a remote computing system. Together, the local network and the remote classifier are able to classify images, while the image never leaves the local computer system. In aspects of the technology, the local network receives a local image and creates a transformed object. The transformed object may be generated by processing the image with a local neural network to generate a multidimensional array and then randomly shuffling data locations within a multidimensional array. The transformed object is communicated to the remote classifier in the remote computing system for classification. The remote classifier may not have the seed used to deterministically scramble the spatial arrangement of data within the multidimensional array.

20 Claims, 10 Drawing Sheets

(51) Int. Cl.
  *G06F 21/60* (2013.01)
  *G06N 3/084* (2023.01)
  *G06F 18/241* (2023.01)
  *G06V 10/764* (2022.01)
  *G06V 10/77* (2022.01)
  *G06F 18/214* (2023.01)
  *G06V 10/774* (2022.01)
  *G06V 10/82* (2022.01)
  *G06V 10/94* (2022.01)
  *G06V 20/20* (2022.01)
  *G06V 40/10* (2022.01)
  *G06V 40/16* (2022.01)

(52) U.S. Cl.
  CPC ........... *G06F 21/602* (2013.01); *G06N 3/084* (2013.01); *G06N 20/00* (2019.01); *G06V 10/764* (2022.01); *G06V 10/774* (2022.01); *G06V 10/7715* (2022.01); *G06V 10/82* (2022.01); *G06V 10/95* (2022.01); *G06V 20/20* (2022.01); *G06V 40/113* (2022.01); *G06V 40/172* (2022.01)

(58) Field of Classification Search
  CPC ...... G06N 3/084; G06V 20/20; G06V 40/113; G06V 10/7715; G06V 40/172; G06V 10/82; G06V 10/95; G06V 10/774; G06V 10/764
  See application file for complete search history.

(56) References Cited

U.S. PATENT DOCUMENTS

| | | | |
|---|---|---|---|
| 11,232,232 B1* | 1/2022 | Cao | G06F 21/602 |
| 2017/0317983 A1* | 11/2017 | Kompalli | G06V 30/40 |
| 2019/0188830 A1* | 6/2019 | Edwards | G06F 18/22 |
| 2019/0392305 A1* | 12/2019 | Gu | G06F 21/53 |
| 2021/0035330 A1* | 2/2021 | Xie | G06N 5/04 |

* cited by examiner

IMAGE CONTENT OBFUSCATION USING A NEURAL NETWORK

CROSS REFERENCE TO RELATED APPLICATIONS

This application is a continuation of application Ser. No. 16/864,465, filed May 1, 2020, entitled IMAGE CONTENT OBFUSCATION USING A NEURAL NETWORK, the entirety of which is hereby incorporated by reference.

BACKGROUND

Technology exists for computers to classify images. Computer classifiers may be computationally intensive and are often run with cloud computing resources. Communicating training images or images to be classified, even in an encrypted state, over a network poses a particular security risk. If a malicious entity is able to obtain an encryption key, then the encrypted images can be decrypted and viewed. In other words, the original image is preserved through the encryption/decryption process. There is a need to communicate image data across a network in a form where the image is not reproducible, even if the image data being transmitted is decrypted.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

The technology described herein increases image security by obfuscating image content before the content is transferred from a local computing system to a remote classifier. The technology described herein obfuscates image content using a first neural network before transferring the obfuscated image content to a second neural network for classification of the content. The obfuscated image content may be described herein as a transformed object. The transformed object may be communicated across a network to a classifier that assigns a classification using the transformed object as input. The neural network generating the transformed object may run on a local computer system. The classifier may run in a remote computing system that is connected to the local computer system by a computer network, such as the Internet, and/or physical data exchange such as via a USB stick. Together, the local neural network and the remote neural network are able to classify images, while neither the image nor any data object that may be reverse engineered to recreate the image leaves the local computer system.

The technology improves the data security of computing systems, especially distributed computing systems, by avoiding a need to transmit an image or data object that may be reverse engineered to recreate the image. The technology may be combined with encryption and other security mechanisms designed to secure data during a communication process or storage. For example, a transformed object, from which the image cannot be reproduced with reasonable certainty, could be encrypted prior to communication from a local computing system to a remote computing system for further processing. Existing encryption and denial of access technology provide a level of data security, but the failure of either technology can result in a data breach. Further, in a distributed environment both the local and remote systems need to be secured against attacks. A failure of either system can result in a data breach. The present technology may add an extra layer of protection for remote processing of image data by removing the remote environment as a possible security failure point for access to the images. Because the images are obfuscated before communication to the remote system, the remote system effectively does not have access to the images. Any transformed objects obtained from the remote system could not be used to reproduce the images with reasonable certainty.

Aspects of the technology may convert the multi-dimensional array output from the local neural network into a transformed object by performing a deterministic scrambling of the spatial information associated with each value in the multi-dimensional array. The deterministic scrambling may be performed by a shuffling algorithm that takes a seed as input. The seed governs the shuffling such that the same spatial shuffling will occur given the same seed. In aspects of the technology described herein, the seed is maintained on the local computing system and is not shared or used in any way by the remote systems performing the classification operation on the transformed object. The multi-dimensional array and the transformed object may have the same overall dimensions (e.g., 7×7×512) and all of the same values. However, the spatial information associated with the values will be different as a result of the deterministic scrambling.

The transformed object effectively obfuscates the original image because the image cannot be reproduced with reasonable accuracy from the transformed object. The transformed object may then be communicated to the remote classifier in the remote computing system for classification.

Aspects of the technology described herein may use two separate training processes. Initially, a complete neural network may be trained in a remote computing system using analogous training data. The remote model is trained using transformed objects output from the local model. Labeled training images from the local computing system are fed to the local model and used to generate a transformed object. The transformed object and the label associated with the image are then communicated to the remote computing system to train the remote classifier. For example, if the goal is to train the model to recognize certain individuals in images, then images of those individuals are processed by the local model to generate a transformed object that is communicated to the remote computing system.

Once trained, unlabeled images may be processed by the local neural network to generate a transformed object and then communicated to the remote computing system for processing and ultimate label assignment by the remote classifier. The classification is then communicated back to the local computing system.

DRAWINGS

Aspects of the technology described herein are described in detail below with reference to the attached drawing figures, wherein.

DETAILED DESCRIPTION

Figure 1:
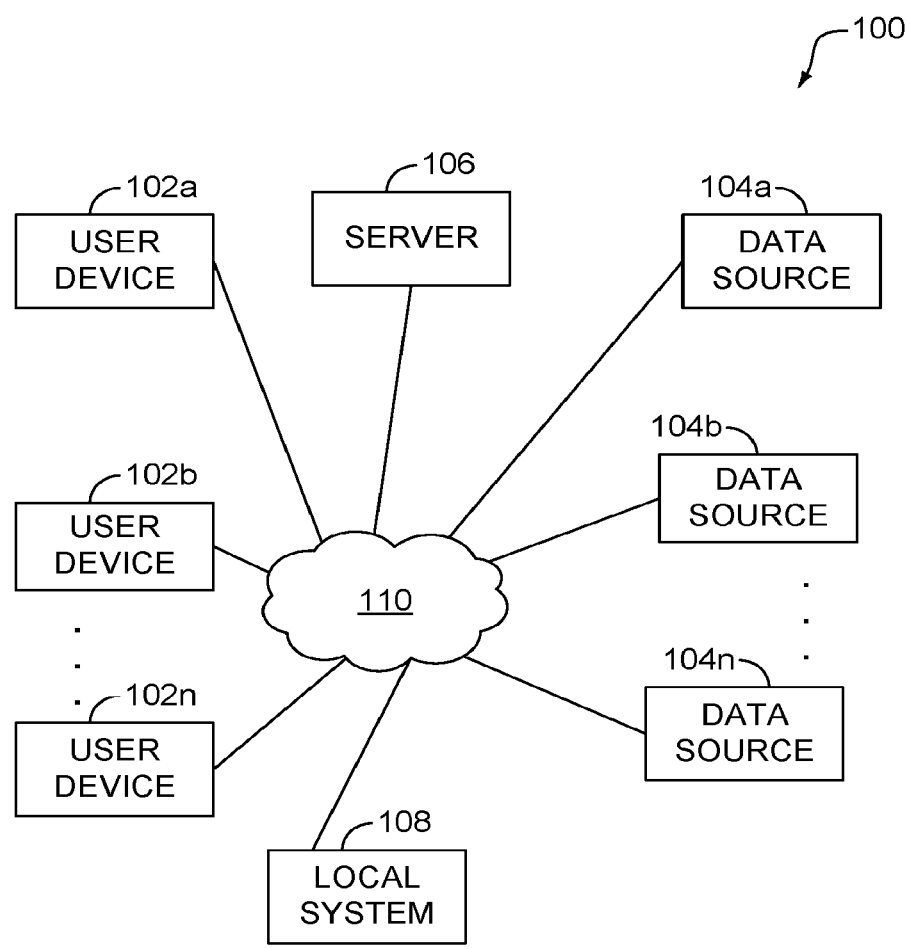
FIG. 1 is a block diagram of an example operating environment suitable for implementing aspects of the technology described herein.

The subject matter of aspects of the technology described herein is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The technology described herein increases image security by obfuscating image content before the content is transferred from a local computing system to a remote classifier. The technology described herein obfuscates image content using a first neural network before transferring the obfuscated image content to a second neural network for classification of the content. The obfuscated image content may be described herein as a transformed object. The transformed object may be communicated across a network to a classifier that assigns a classification using the transformed object as input. The neural network generating the transformed object may run on a local computer system. The classifier may run in a remote computing system that is connected to the local computer system by a computer network, such as the Internet, and/or physical data exchange such as via a USB stick. Together, the local neural network and the remote neural network are able to classify images, while neither the image nor any data object that may be reverse engineered to recreate the image leaves the local computer system.

The technology improves the data security of computing systems, especially distributed computing systems, by avoiding a need to transmit an image or data object that may be reverse engineered to recreate the image. The technology may be combined with encryption and other security mechanisms designed to secure data during a communication process or storage. For example, a transformed object, from which the image cannot be reproduced with reasonable certainty, could be encrypted prior to communication from a local computing system to a remote computing system for further processing. Existing encryption and denial of access technology provide a level of data security, but the failure of either technology can result in a data breach. Further, in a distributed environment both the local and remote systems need to be secured against attacks. A failure of either system can result in a data breach. The present technology may add an extra layer of protection for remote processing of image data by removing the remote environment as a possible security failure point for access to the images. Because the images are obfuscated before communication to the remote system, the remote system effectively does not have access to the images. Any transformed objects obtained from the remote system could not be used to reproduce the images with reasonable certainty.

Aspects of the technology may convert the multi-dimensional array output from the local neural network into a transformed object by performing a deterministic scrambling of the spatial information associated with each value in the multi-dimensional array. The deterministic scrambling may be performed by a shuffling algorithm that takes a seed as input. The seed governs the shuffling such that the same spatial shuffling will occur given the same seed. In aspects of the technology described herein, the seed is maintained on the local computing system and is not shared or used in any way by the remote systems performing the classification operation on the transformed object. The multi-dimensional array and the transformed object may have the same overall dimensions (e.g., 7×7×512) and all of the same values. However, the spatial information associated with the values will be different as a result of the deterministic scrambling.

The transformed object effectively obfuscates the original image because the image cannot be reproduced with reasonable accuracy from the transformed object. The image cannot be reproduced because the spatial information from the image has been effectively removed from the values in transformed object. Conceptually, the values in the transformed object each represent the result of a series of feature identification operations performed by the local neural network. For example, the operations can look for shapes, colors, and other image features in blocks of adjacent image pixels. These values could be reverse engineered to reveal colors and shapes in the original image. If the values can be mapped to their original locations using spatial information, then the image can be reproduced, at least approximately, by displaying the shapes and colors the values indicate are present. Importantly, image content can be identified within these reverse engineered images. Without the spatial information, the colors and shapes might be able to be reproduced, but the shapes and colors can't be mapped back to their point of origin in the image. Thus, the result of reverse engineering the transformed object would be a jumble of colors and shapes without their original spatial relationship to each other.

As used herein, a neural network comprises at least three operational layers. The three layers may include an input layer, a hidden layer, and an output layer. Each layer comprises neurons. The input layer neurons pass data to neurons in the hidden layer. Neurons in the hidden layer pass data to neurons in the output layer. The output layer then produces an output that may be in different forms. Different types of layers and networks connect neurons in different ways.

Every neuron has weights, an activation function that defines the output of the neuron given an input (including the weights), and an output. The weights are the adjustable parameters that cause a neural network to produce a correct output. The weights are adjusted during training. Once trained, the weight associated with a given neuron may remain fixed. The other data passing between neurons may change in response to a given input (e.g., image).

The neural network may include many more than three layers. Neural networks with more than one hidden layer may be called deep neural networks. Example neural networks that may be used with aspects of the technology described herein include, but are not limited to, multilayer perceptron (MLP) networks, convolutional neural networks (CNN), recursive neural networks, recurrent neural networks, and long short-term memory (LSTM) (which is a type of recursive neural network). The implementation described herein in association with the Figures uses a convolutional neural network, but aspects of the technology are applicable to other types of classification technology.

In aspects of the technology, the local neural network receives a local image and creates a numeric representation, such as a multi-dimensional array. In one aspect, the numeric representation is a three-dimensional array. In a three-dimensional array, each value in the array is associated with spatial information that is defined by three spatial values. A three-dimensional array may be thought of as a group of two-dimensional arrays. The three spatial values that define the spatial location of a value in a three-dimensional array may include a first value that defines a row within a single array, a second value that defines a column within the same array, and a third value may identifies the array. Thus, a single value in a three-dimensional array could be notated as 0.5 (1, 7, 35), where "0.5" is the value, "1" designates a row, "7" designates a column, and "35" designates array.

Aspects of the technology described herein may use two separate training processes. Initially, a complete neural network may be trained in a remote computing system using analogous training data. This model may be described herein as an analogous model or local model. For example, if a goal of the completed system is to identify certain people through facial recognition, then the analogous model could be trained on facial recognition databases. This should allow the model to develop weights that recognize relevant facial features for recognition. The analogous model is then communicated to the local computing system.

The remote model is trained using transformed objects output from the local model. Thus, the remote model is trained using training data that does not include a feature's (as indicated by a value) absolute spatial information (point of origin) or relative spatial information to other features. Labeled training images from the local computing system are fed to the local model and used to generate a transformed object. The transformed object and the label associated with the image are then communicated to the remote computing system to train the remote classifier. For example, if the goal is to train the model to recognize certain individuals in images, then images of those individuals are processed by the local model to generate a transformed object that is communicated to the remote computing system. Identification information (e.g., labels) for the individuals depicted in an image that resulted in the transformed object are communicated with the transformed object.

Once trained, unlabeled images may be processed by the local neural network to generate a transformed object and then communicated to the remote computing system for processing and ultimate label assignment by the remote classifier. The classification is then communicated back to the local computing system.

Turning now to FIG. 1, a block diagram is provided showing an example operating environment 100 in which some aspects of the present disclosure may be employed. It should be understood that this and other arrangements described herein are set forth only as examples. Other arrangements and elements (e.g., machines, interfaces, functions, orders, and groupings of functions, etc.) may be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user devices, such as user devices 102a and 102b through 102n; a number of data sources, such as data sources 104a and 104b through 104n; local computing system 108; remote server 106; and network 110. It should be understood that environment 100 shown in FIG. 1 is an example of one suitable operating environment. Each of the components shown in FIG. 1 may be implemented via any type of computing device, such as computing device 1000 described in connection to FIG. 10. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

User devices 102a and 102b through 102n may be client devices on the client-side of operating environment 100, while server 106 may be on the server-side of operating environment 100. The user devices may send and receive communications including images, generate images, and store images. These images may be transferred to a data store 104, which may be a local data store. The user devices 102 may generate user interfaces that are used to control other components, including server 106 components and local computing system 108 components. Local computing system 108 may include directly connected user devices that do not connect via the network 110. The user device 102 may be a source of user information, such as a location information (e.g., GPS), calendar information, communication information, and other metadata that may be processed with images, in some aspects.

Server 106 may comprise server-side software designed to work in conjunction with client-side software on user devices 102a and 102b through 102n and local computing system 108 so as to implement any combination of the features and functionalities discussed in the present disclosure. For example, the server 106 may run a remote classifier, such as remote system 280, which classifies images based on transformed objects received from a local neural network running on the local computing system 108. The server 106 may operate in a remote computing system and comprise multiple hardware devices for operating the model, including a plurality of graphics processing units (GPU), which may be described as a GPU farm. This division of operating environment 100 is provided to illustrate one example of a suitable environment, and there is no requirement for each implementation that any combination of server 106 and user devices 102a and 102b through 102n remain as separate entities.

User devices 102a and 102b through 102n may comprise any type of computing device capable of use by a user. For example, in one aspect, user devices 102a through 102n may be the type of computing device described in relation to FIG. 10 herein. By way of example and not limitation, a user device may be embodied as a personal computer (PC), a laptop computer, a mobile or mobile device, a smartphone, a tablet computer, a smart watch, a wearable computer, a virtual reality headset, augmented reality glasses, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, or any combination of these delineated devices, or any other suitable device.

Data sources 104a and 104b through 104n may comprise data sources and/or data systems, which are configured to make data available to any of the various constituents of operating environment 100, or system 200 described in connection to FIG. 2. (For example, in one aspect, one or more data sources 104a through 104n provide (or make available for accessing) images to the local computing system 240 of FIG. 2.) Data sources 104a and 104b through 104n may be discrete from user devices 102a and 102b through 102n and server 106 or may be incorporated and/or integrated into at least one of those components.

Local computing system 108 may provide resources to run local computing system 240. The local computing system 108 may be associated with a single entity, such as a business or government agency. The data sources 104a through 104n may include local data sources associated with the local computing system 108.

Figure 2:
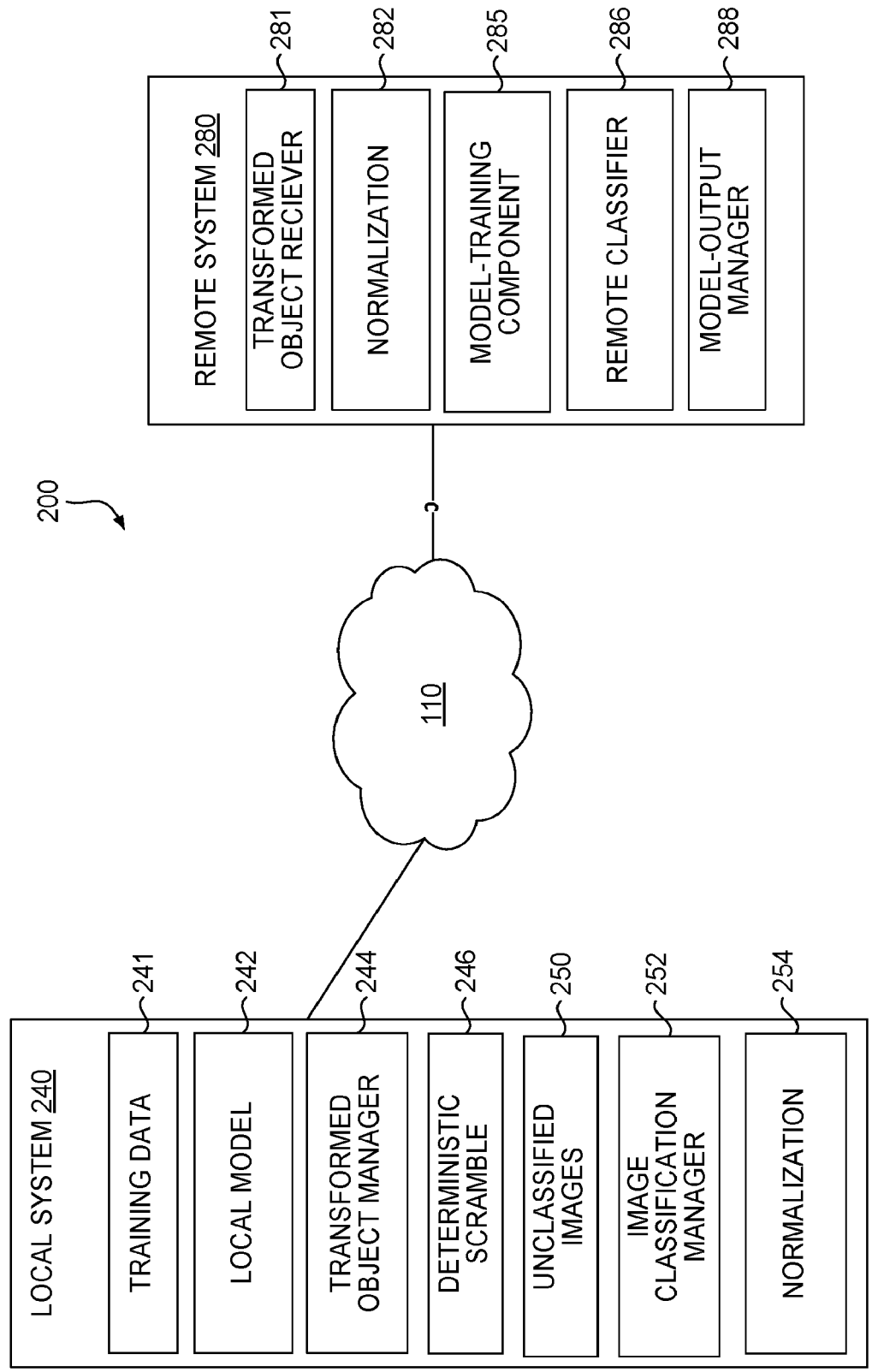
FIG. 2 is a diagram depicting an example computing architecture suitable for implementing aspects of the technology described herein.

Operating environment 100 may be utilized to implement one or more of the components of system 200, described in FIG. 2.

Referring now to FIG. 2, with FIG. 1, a block diagram is provided showing aspects of an example computing system architecture suitable for implementing an aspect of the technology described herein and designated generally as system 200. System 200 represents only one example of a suitable computing system architecture. Other arrangements and elements may be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Example system 200 includes network 110, which is described in connection to FIG. 1, and which communicatively couples components of system 200 including local system 240 and remote system 280. Remote system 280 (including its components 281, 282, 285, 286, and 288) and local system 240 (including its components 241, 242, 244, 246, 250, and 252) may be embodied as a set of compiled computer instructions or functions, program modules, computer software services, or an arrangement of processes carried out on one or more computer systems, such as computing device 1000 described in connection to FIG. 10.

Moreover, these components, functions performed by these components, or services carried out by these components may be implemented at appropriate abstraction layer(s), such as the operating system layer, application layer, hardware layer, etc., of the computing system(s). Alternatively, or in addition, the functionality of these components and/or the aspects of the technology described herein may be performed, at least in part, by one or more hardware logic components. For example, and without limitation, illustrative types of hardware logic components that may be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein regarding specific components shown in example system 200, it is contemplated that in some aspects functionality of these components may be shared or distributed across other components.

The local system 240 generates a transformed object by processing an image with a local model 242. The local system 240 comprises training data 241, local model 242, transformed object manager 244, deterministic scramble component 246, unclassified images 250, image classification manager 252, and normalization component 254.

The training data 241 comprises labeled images. The label(s) of each labeled image may correspond to an object and/or characteristics of the object visibly depicted in the image. For example, an image of a cat could be labeled with a "cat" tag. Characteristics of the cat could include a cat breed, hair color, hair length, size, or activity. All of these characteristics could form separate labels for an image. Thus, an image may have multiple labels. The labels may be assigned by a human viewing the image. An image with multiple objects may have individual objects labeled. These labels may identify an area of the image that depicts the object associated with the label. As explained in more detail, the training data 241 is used to train a neural network to recognize similar objects in unclassified images. For example, images of a cat may be used to train the local neural network to recognize cats in other images.

The local model 242 may be a neural network trained to classify images. In one aspect, the local model 242 includes a neural network capable of classifying images except for that it does not include a Sigmoid function, angular visual hardness function, or other function used to calculate a series of class indications, such as confidence factors. The input layer of the local model 242 receives an image and generates an output that is mapped to a subsequent layer. The subsequent layer similarly generates an output, which may also be described herein as a multidimensional array. A series of multidimensional arrays may be passed between layers until a final output in the form of a multidimensional array is generated. The multidimensional array is passed to the deterministic scramble component 246, which generates a transformed object.

The local model 242 may be trained remotely in a remote computing system using analogous training data. For example, if an entity wishes to keep its database of labeled cat images on a local system, a publicly available database of cat images may be used as analogous training data to train an analogous model, such as local model 300, shown in FIG. 3. Note, in this example, the training data 241 is not used to train the local model 242. The local model 242 may be used to generate transformed objects that are used to train the remote classifier 286.

The transformed object manager 244 communicates transformed objects to the remote system 280. The transformed object manager 244 may also communicate image labels with the transformed objects during training of the remote classifier 286. When training data is processed by the local model 242, then labels associated with the images used to generate the transformed objects are also communicated to the remote system 280.

The transformed object manager 244 may assign identifications to a transformed object. The identification may be used by the image classification manager 252 to associate a label provided by the remote system 280 with an unclassified image. For example, a transformed object may be generated from an image by the local model 242. The transformed object may be associated with an identification that may be used to associate the transformed object with the image used to generate it. The transformed object may be communicated from the transformed object manager 244 to the remote system 280 along with identification information for the transformed object. Upon generating a classification using the transformed object as input, the remote system 280 may communicate the classification along with the identification to the image classification manager 252. The image classification manager 252 may then use the identification information to associate the provided classification with the image. The new classification may then accessed by users of the local system 240 in a variety of ways. For example, a report could be run that identifies all images assigned to particular class. A query function could specify images by classification and other features. A filter could take the classification as a filter criterion.

The unclassified images 250 are a collection of images to be classified by the combined efforts of the local system 240 and the remote system 280. The unclassified images 250 are fed to the local model 242 and used to generate transformed objects. The transformed objects are communicated from the transformed object manager 244 to the transformed object receiver 281. The transformed objects may be normalized by normalization component 282 and then input to the remote classifier 286. The remote classifier 286 assigns a classification using the transformed object as input. The classification may be communicated back to the image classification manager 252 and associated with the image that was used to generate the associated transformed object.

The image classification manager 252 receives classification information from the remote system 280. The image classification manager 252 then associates that classification with an image that was used to generate the transformed object processed by the remote system 280 to generate the classification.

The normalization component 254 performs a normalization operation on values in the transformed object. A normalization component can be located on the local system 240 and/or the remote system 280. Two are shown in FIG. 2 to illustrate this point. In aspects, a single normalization operation is performed and it can be performed on either the local side or remote side. The goal of normalization is to limit the values to a particular range. For example, it may be advantageous for each value to be normalized into a range between 0 and 1. Different normalization processes may be used with the technology described herein. In one aspect, the normalization operation generates a normalized value ($V_n$) from a value (V) by using the maximum and minimum values found within the training data. The maximum and minimum values may be determined on a per location basis within the transformed object. For example, in order to normalize a value found at row 4, column 6, of array 234 the maximum and minimum value found at row 4, column 6, of array 234 in any transformed object generated from training images may be determined. The normalization can then occur by subtracting the minimum value found from the value (V) being normalized. This difference can then be divided by the difference between the max value and minimum value. Expressed as a formula the normalization can be ($V_n$)=(V−min)/(max−min). This process can be repeated for each value within the transformed object. In an aspect, the minimum and maximum value are from any location within the transformed objects generated from training data.

The remote system 280 assigns a classification to an image by taking the transformed object received from the local system 240 as input. The remote system may include one or more data centers separated from the local system 240 by a computer network. The remote system 280 comprises transformed object receiver 281, normalization component 282, model-training component 285, remote classifier 286, and model output manager 288.

The analogous training data is used to train the analogous model. As mentioned, the goal of the technology described herein is to maintain images on the local computing system, rather than transferring them to a remote computing system for processing. This means that training data 241 is not transferred to the remote system 280 to train a neural network. The analogous training data comprises labeled images of subject matter that is analogous to the subject matter in images that will ultimately be classified. Generally, a neural network starts with random values assigned as preliminary weight values for each node. During training, the neural network recalculates these values as different image features prove to have more value in predicting a classification. Accordingly, the weights assigned by the analogous model using the analogous training data provide reasonable weights for use classifying similar images.

The normalization component 282 performs a normalization operation on values in the transformed object. A normalization component can be located on the local system 240 and/or the remote system 280. Two are shown in FIG. 2 to illustrate this point. In aspects, a single normalization operation is performed and it can be performed on either the local side or remote side. The goal of normalization is to limit the values to a particular range. For example, it may be advantageous for each value to be normalized into a range between 0 and 1. Different normalization processes may be used with the technology described herein. In one aspect, the normalization operation generates a normalized value ($V_n$) from a value (V) by using the maximum and minimum values found within the training data. The maximum and minimum values may be determined on a per location basis within the transformed object. For example, in order to normalize a value found at row 4, column 6, of array 234 the maximum and minimum value found at row 4, column 6, of array 234 in any transformed object generated from training images may be determined. The normalization can then occur by subtracting the minimum value found from the value (V) being normalized. This difference can then be divided by the difference between the max value and minimum value. Expressed as a formula the normalization can be ($V_n$)=(V−min)/(max−min). This process can be repeated for each value within the transformed object. In an aspect, the minimum and maximum value are from any location within the transformed objects generated from training data.

Transformed object receiver 281 receives transformed objects from the transformed object manager 244. The transformed object receiver 281 then communicates the transformed objects to normalization component 282 for normalization. The normalized transformed objects are then communicated to the remote classifier 286 for processing.

Model-training component 285 trains the remote classifier 286. The model-training component 285 the remote classifier 286 using transformed objects generated from the training data 241. In each type of deep model, training is used to fit the model output to the training data. In particular, weights associated with each neuron in the model may be updated through training. Originally, the model may comprise random weight values that are adjusted during training. In one aspect, the model is trained using backpropagation. The backpropagation process comprises a forward pass, a loss function, a backward pass, and a weight update. This process is repeated for each training image. The goal is to update the weights of each neuron (or other model component) to cause the model to produce an output that maps to the correct label. Each labeled image is input to the model and used to train it. Once a sufficient number of training images are fed to the classifier 286, then the training may stop. The remote classifier 286 may then be used to classify unlabeled images.

Remote classifier 286 may be a stand-alone neural network. The remote classifier 286 comprises a function that outputs a classification statistic. Example functions include sigmoid layer or angular hardness function. The remote classifier 286 may be trained as described with reference to FIG. 5. The remote classifier can be a neural network that includes convolutional layers, pooling layers, and fully connected layers. Different arrangements of these operations are possible.

In one aspect, the remote classifier 286 is a nine layer convolutional neural network. The first layer may be an input layer with dimensions of 7×7×512. The dimensions in the input layer may have the same dimensions as the transformed object. The second layer may be a 2D convolutional layer with the dimensions of 5×5×256. The third layer may be a 2D convolutional layer with the dimensions of 5×5×128. The fourth layer may be a rectified linear unit "ReLU" activation layer with the dimensions of 5×5×128. The fifth layer may be a ReLU activation layer with the dimensions of 5×5×128, but trained with a 50% drop out. The sixth layer is a flattening layer that transforms the three-dimensional array of data from the sixth layer into a vector. In this case, the vector output may be 640×640 when the input is a three-dimensional array. The seventh layer may be a dense layer. The eight layer may be a dense layer. The ninth and final layer may be a sigmoid function that assigns the classification statistics, such as confidence scores for different classifications.

The remote classifier is trained using transformed objects output from the local model. Thus, the remote model is trained using training data that does not include a feature's absolute spatial location (area of origin in the image) or relative spatial location to other features. Typically, the spatial relationship of features is an important signal when performing content classification and classification performance would be expected to decrease without the spatial information. However, the technology described herein is trained in a way that the actual spatial information is not needed because of the deterministic scrambling used to generate the transformed object. The deterministic scrambling removes the spatial relationship of feature values to the image. However, the use of deterministic scrambling occurs the same way with every image. This means the feature values are moved from place to place in the exact same way each time a transformed object is generated. This allows content patterns to be preserved for the purpose of classification even though they don't spatially map to the original image. These content patterns are not found in adjacent or spatially related neurons as would normally be the case. But, the patterns, which appears completely random to a person, can still be learned through training because the pattern is consistent from transformed object to transformed object.

Model output manager 288 receives a classification from the remote classifier 286 and communicates it to the image classification manager 252. The classification may be associated with an image in the unclassified images 250. To aid this process, the same identification may be associated with an image, a transformed object generated from the image, and a classification generated from the transformed object. In this way the classification may be associated with the original image.

Figure 3:
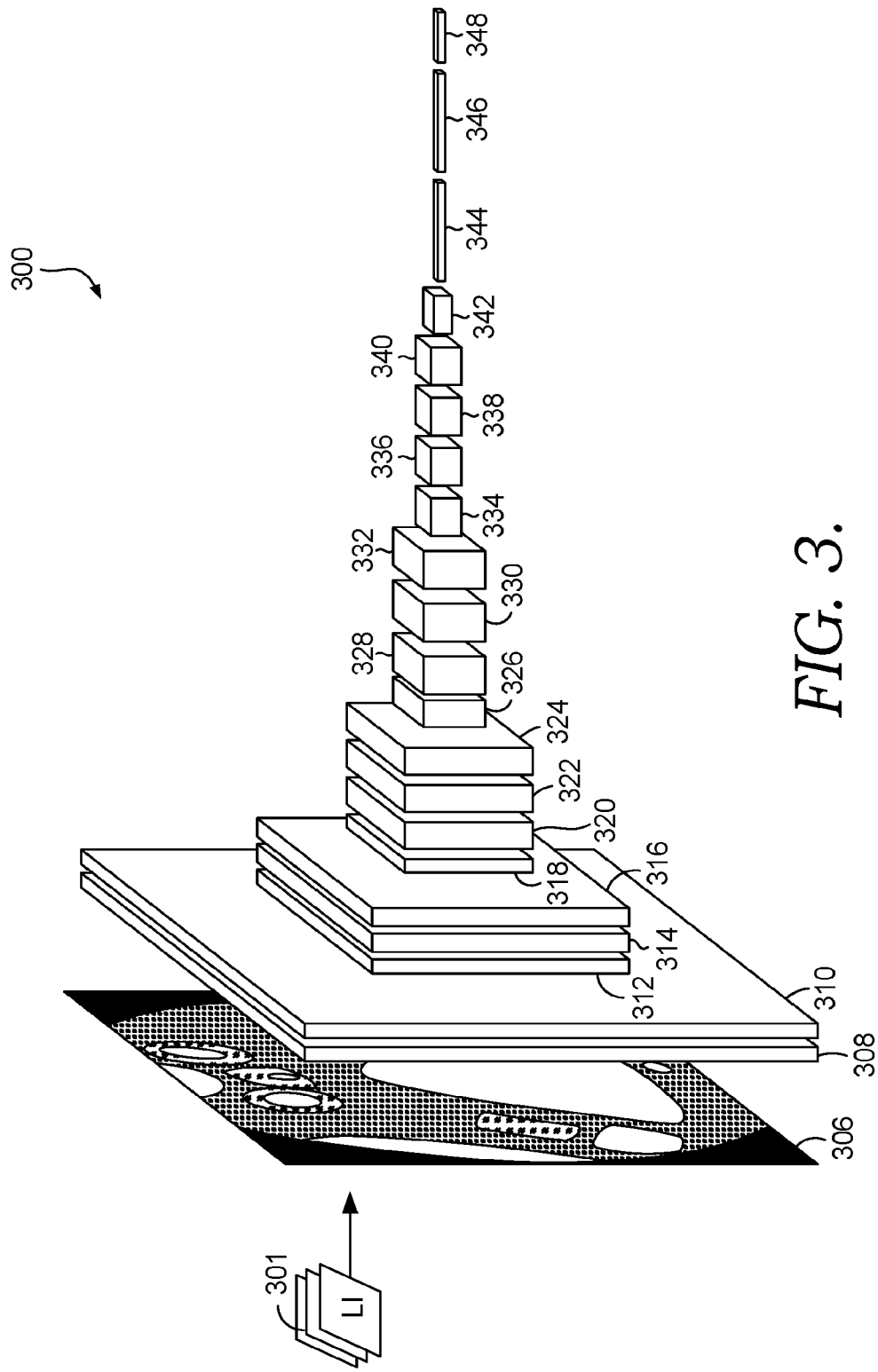
FIG. 3 is a diagram depicting an local model, in accordance with an aspect of the technology described herein.

Turning now to FIG. 3, an exemplary local model architecture 300 is depicted. Local model architecture 300 could be used by the local model 242. The local model architecture 300 shown is a convolutional deep network, but other model types may be used in aspects of the invention. Local model architecture 300 follows the VGG-16 architecture. The local model includes 21 layers including 13 convolutional layers, 5 max pooling layers, and 3 fully connected layers.

The convolutional layers comprise a first convolutional layer 306, a second convolutional layer 308, a third convolutional layer 312, a fourth convolutional layer 314, a fifth convolutional layer 318, a sixth convolutional layer 320, a seventh convolutional layer 322, an eight convolutional layer 326, a ninth convolutional layer 328, a tenth convolutional layer 330, an eleventh convolutional layer 334, a twelfth convolutional layer 336, and a thirteenth convolutional layer 338). The first convolutional layer 306 and the second convolutional layer 308 each have 64 filters. The third convolutional layer 312 and the fourth convolutional layer 314 each have 128 filters. The fifth convolutional layer 318, the sixth convolutional layer 320, and the seventh convolutional layer 322 each comprise 256 filters. The remaining convolutional layers have 512 filters.

The max pooling layer 340 is followed by three fully connected layers (a first fully-connected layer 340, a second fully-connected layer 342, and an output layer 344). The first convolutional layer 306 servers as the input layer and may receive a 224×224 pixel image. Each pooling layer (310, 316, 324, 332, and 338) performs a 2×2 pooling operation. Aspects of the technology described herein are not limited to this arrangement.

The input layer converts the image into data that may be processed by the first convolutional layer 306. In one aspect, the input layer comprises three layered arrays. Each node in the array represents a pixel in the image. Each array represents either red, green, or blue. In the red array, a node may be the intensity of red associated with the node's pixel. In this way, each pixel is represented by three nodes; one in each sub-layer within the input layer. The input layer 302 does not sufficiently obfuscate the image data as the image may be reproduced using the data stored in the input layer 302.

Initially, an image from analogous images 301 is processed as input. The processing occurs the same way whether in training or production mode. The only difference is that the neuron weights in the model may be changed after a classification is produced while in training mode. In this example, the image may be 224×224 pixels. The depth of input layer 302 may be described as three because each pixel may have a red, green, and blue (RGB) pixel intensity value.

The first convolutional layer 306 comprises multiple sublayers, described herein as feature maps. Each feature map (i.e., sublayer) may be associated with a different filter operation. The filter operation may be described as a neuron's activation function. The goal of the filter may be to detect low-level shapes in an image, such as a curve or line. Each filter operation works on a group of pixels in the image that may be described as a receptive field. Each neuron in a sublayer has a different receptive filed. The output of the filter operation combined with a weight assigned to a neuron may be the neuron's output. For example, a filter operation on a 5×5×3 receptive field 304 of the input layer 302 may produce a single value. When combined with the weight of the neuron the result is the output of a single neuron in the first convolutional layer 306. This process is repeated for adjacent neurons in the feature map, which will each use a different receptive field. The process may also be repeated on the same receptive field by each neuron in different feature maps within the convolutional layer using the filter operation associated with the respective feature map.

If the receptive field contains a sought after feature (e.g., a curve, honeycomb shape, a triangle) then a different number would result than if it did not. For example, a filter operation that did not find a sought after feature could return a zero value in contrast to a value of 1000 if the feature in the image exactly matched a feature in the filter.

The feature map is populated by running the same filter operation over different receptive fields of the input layer 302, eventually processing the entire input layer 302. Sections of the input layer 302 to be mapped are determined by the stride selected. The stride is a distance between center pixels of adjacent receptive fields. The adjacent receptive fields are associated with adjacent neurons. A stride of one pixel would cause the adjacent receptive field to have a center pixel adjacent to a center pixel in the first receptive field. A stride of two would cause the center pixel of a receptive field to move over two pixels. Aspects of the technology may be used with different strides, such as a stride of 2, 4, or 6.

The first convolutional layer 306 comprises multiple feature maps; each feature map comprising an array of neurons populated using the same filter operation. The first feature map may look for curves, the second feature map lines, the third feature map a blue color blob, and so on. Different weights may be calculated for each neuron during training. A convolutional layer with 64 feature maps may be said to have a depth of 64. The height and width dimensions will depend on the image size, receptive field size, and stride. For this example, the first convolutional layer 306 may have a height and width of 224.

The other convolutional layers may work in a similar fashion, with a receptive field of various dimensions in a prior layer mapping to a neuron in a subsequent layer. The functions may be of different types in different layers, for example, pooling functions, rectified linear unit operations, and such.

The first pooling layer 310 may be a pooling layer that comprises neurons arranged in feature maps that perform a down sampling operation. A purpose of the pooling layer is to reduce the amount of data to process. Each neuron in the first pooling layer 310 has a receptive field in the second convolutional layer 308. For example, a neuron could have a receptive field of 2×2 neurons meaning it processes the output of those four neurons. In a max pooling operation, the highest value of the four values produced by neurons in the 2×2 grid within the receptive field may be selected by the activation function of a single neuron in the first pooling layer 310. The output of this neuron may be the highest value.

Figure 4:
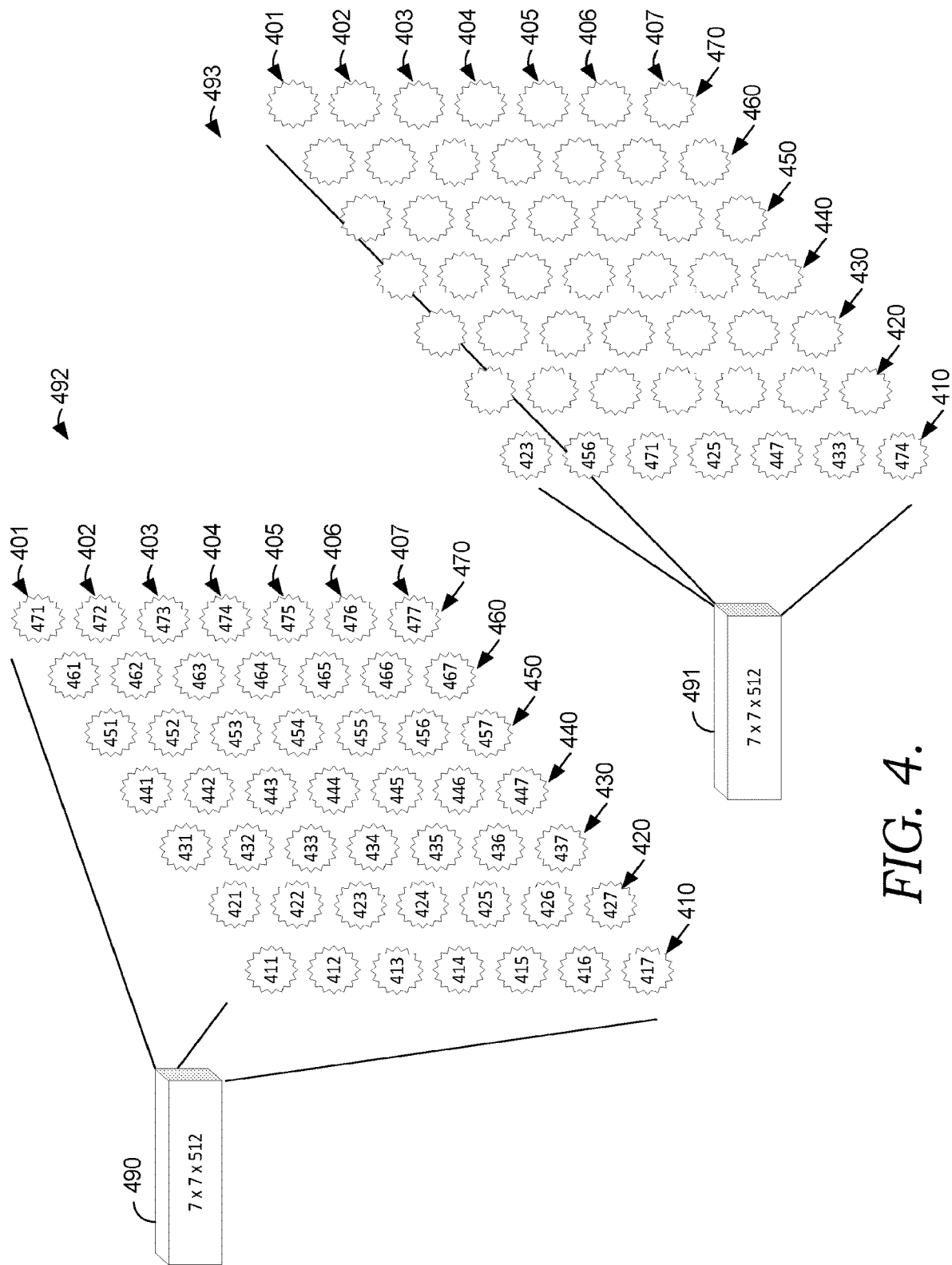
FIG. 4 is a diagram depicting a transformed object, in accordance with an aspect of the technology described herein.

Turning now to FIG. 4, the spatial shuffling of a multi-dimensional array to produce a transformed object is illustrated, according to an aspect of the technology described herein. In aspects of the technology, the local neural network receives a local image and creates a multidimensional array, such as a three-dimensional array 490. In a three-dimensional array, each value in the array is associated with spatial information that is defined by three spatial values. A three-dimensional array may be thought of as a group of two-dimensional arrays. For example, the three-dimensional array 490 has dimension of 7×7×512. That means the three-dimensional array 490 comprises 512 7×7 arrays. The three spatial values that define the spatial location of an individual value in a three-dimensional array may include a first value that defines a row within a single array, a second value that defines a column within the same array, and a third value may identifies the array. Thus, a single value in a three-dimensional array could be notated as 0.5 (1, 7, 35), where "0.5" is the value, "1" designates a row, "7" designates a column, and "35" designates array.

Aspects of the technology may convert the multi-dimensional array output from the local neural network into a transformed object 491 by shuffling the spatial information associated with each value in the multi-dimensional array. Essentially, this operation moves the individual values to different locations within a multi-dimensional array. The three-dimensional array 490 and the transformed object 491 may have the same overall dimensions (e.g., 7×7×512) and all of the same values. However, the spatial information associated with the values will be different.

FIG. 4 shows a blown up view of a single 7×7 array 492 within the three-dimensional array 490. As can be seen, the single array 492 comprises seven rows (401, 402, 403, 404, 405, 406, and 407) and seven columns (410, 420, 430, 440, 450, 460, and 470) of data values (e.g., 411, 412, and 413). Each data value is associated spatial information derived from the array, the array column, and the array row. For the sake of illustration, assume the single array 492 is the $510^{th}$ array in the three-dimensional array 490. Thus, spatial location for value 411 can be designated as array 510, row 401, and column 410. For the sake of illustration, the value assigned to value 411 could be 0.5, which is independent of its location.

The deterministic scrambling changes the location of the values within the three-dimensional array 490 to form the transformed object 491. The deterministic scrambling is illustrated by the blown up view of the scrambled $510^{th}$ array 493. As can be seen, values 423, 456, 471, 425, 447, 433, and 474 have all moved to different locations within the scrambled $510^{th}$ array 493 as compared to their original locations in the unscrambled $510^{th}$ array 492. The values themselves have not changed. Thus, the value assigned to value 411 would be the same, but value 411 would be in a new location. FIG. 4 illustrates the rearrangement of values within a single array. However, aspects of the technology described herein may move values between arrays. Thus, a value originally in a first array (e.g., $510^{th}$) may be moved to a second array (e.g., $345^{th}$). In one aspect, a value can be moved to any other spatial location within the transformed object 491. In a different implementation, movement is limited to different locations within an array.

In one aspect, the spatial deterministic scrambling is implemented using a relocation algorithm. Deterministic scrambling is based on a seed that is used to produce every deterministic scrambling. In other words, the deterministic scrambling is random the first time, but will be the same every subsequent time when the same seed is used. Thus, if value 411 moves from location 401, 410, 510 to location 405, 430, 510 when the multidimensional array is deterministic scrambled, then the value in location 401, 410, 510 will always move to location 405, 430, 510 in subsequent deterministic scrambling operations. In order to be unscrambled, the seed and function used would be needed. In aspects, the seed is not communicated to the remote environment and is instead maintained only at the local environment. As used herein, an undisclosed seed is a seed that is not disclosed to the remote computing environment or used in any operation on the transformed object before being input to the classifier. The deterministic scrambling differs from encryption in several ways. For example, the data structure produced by the deterministic scrambling is computer readable without a decryption key. The spatial arrangement of the data within the structure (e.g., three-dimensional array) is changed, but the data itself is not changed or hidden in any way by the deterministic scrambling. Unlike with encryption, the transformed object resulting from the deterministic scrambling is readable and usable by a computer without additional steps, such as decryption. In fact, aspects of the technology described herein may feed the transformed object into the remote classifier without any additional adjustment to the spatial arrangement of values within the structure. As described elsewhere, the values themselves may be normalized, but the normalization does not change the spatial arrangement of the values.

Figure 5:
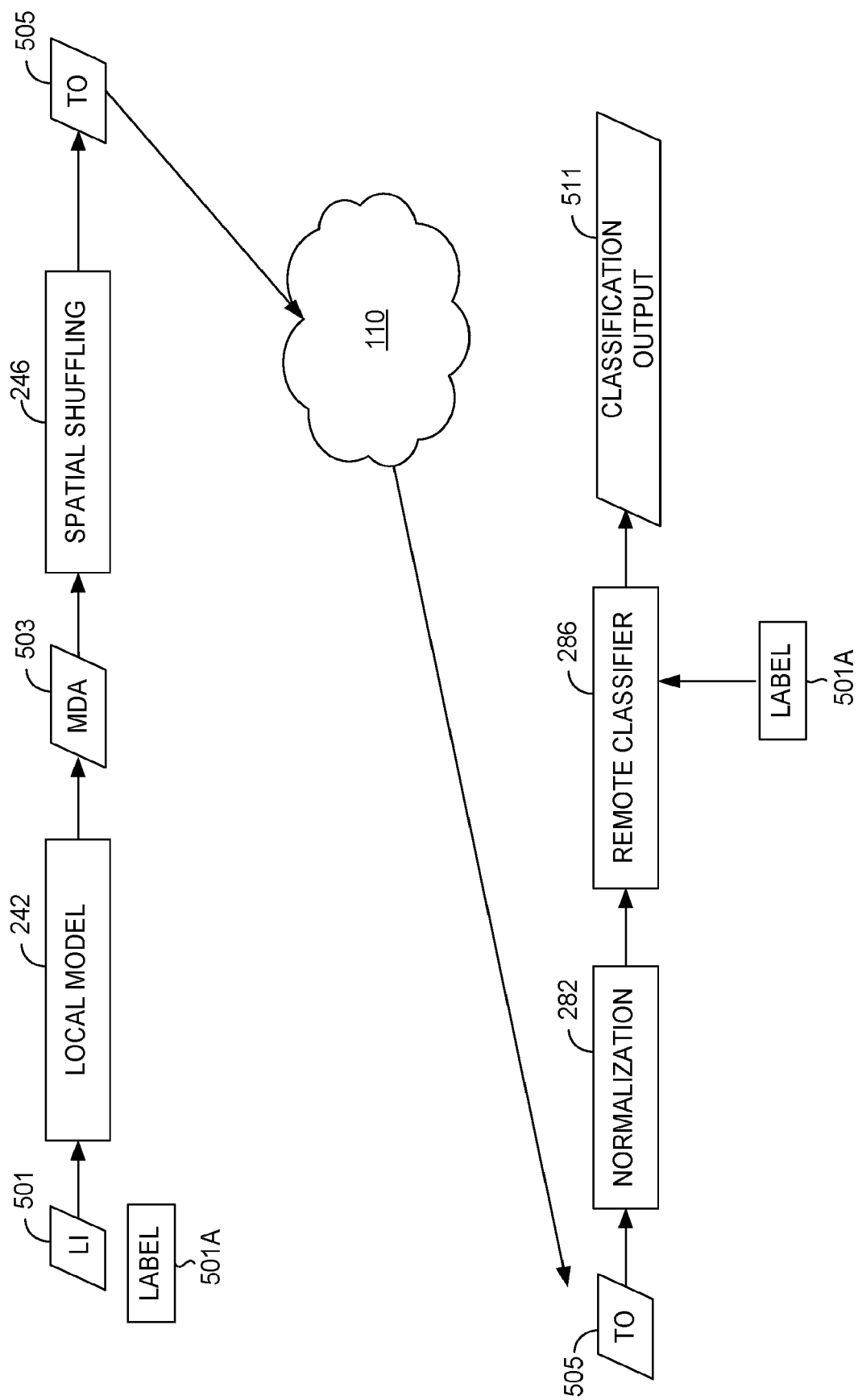
FIG. 5 is a diagram depicting training of a remote classifier using obfuscated image data, in accordance with an aspect of the technology described herein.

Turning now to FIG. 5, a remote classifier 286 is trained according to an aspect of the technology described herein. The training begins by submitting labeled training image 501 to the local model 242. At the point when the remote classifier 286 is being trained, the local model has already been trained through a separate process. The local model 242 receives a training image 501. The local model 242 does not need to receive the label 501A for the image 501 because the local model 242 is not being trained. The local model 242 processes the image and generates a multidimensional array 503. The multidimensional array 503 is passed to the deterministic scrambling component 246, which generates a transformed object 505. The transformed object 505 may have the same dimension (e.g., 7×7×512) as the last layer in the local model 242, but does not include the weights or the activation function of the last layer. Instead, the transformed object 505 includes only the outputs of each neuron, while maintaining the same dimensions, but with a different spatial relationship of values than found in the multidimensional array 503.

The transformed object 505 and the label 501A are communicated over the network 110 to the remote computing system. In an alternative aspect, the transformed object 505 may be communicated via physical data transfer on a USB stick or other storage medium.

The transformed object 505 may go through the normalization process described previously. Once the data from the normalized transformed object 505 is received by neurons in the input layer of the remote classifier, the remote classifier 286 operates as described previously to generate a classification 511 for the image 501. In one aspect, the classification is the highest score of a classification distribution of classes being classified. The transformed object 505 is not unscrambled before processing by the remote classifier. As used herein, unscrambled means restoring the values within the transformed object 505 to the spatial locations the objects were in within the multidimensional array 503 used to generate the transformed object.

The classification is then compared with the label 501A, and the remote classifier 286 is retrained using back propagation or some other training method suitable the architecture of the remote classifier 286. In other words, the weights associated with neurons in the remote classifier 286 are updated. This process repeats with multiple training images until the remote classifier 286 is trained at which point the neuron weights may be fixed. Notice that the training does not extend back to the local model 242 in this example, which remains the same as when trained by the analogous training data.

Figure 6:
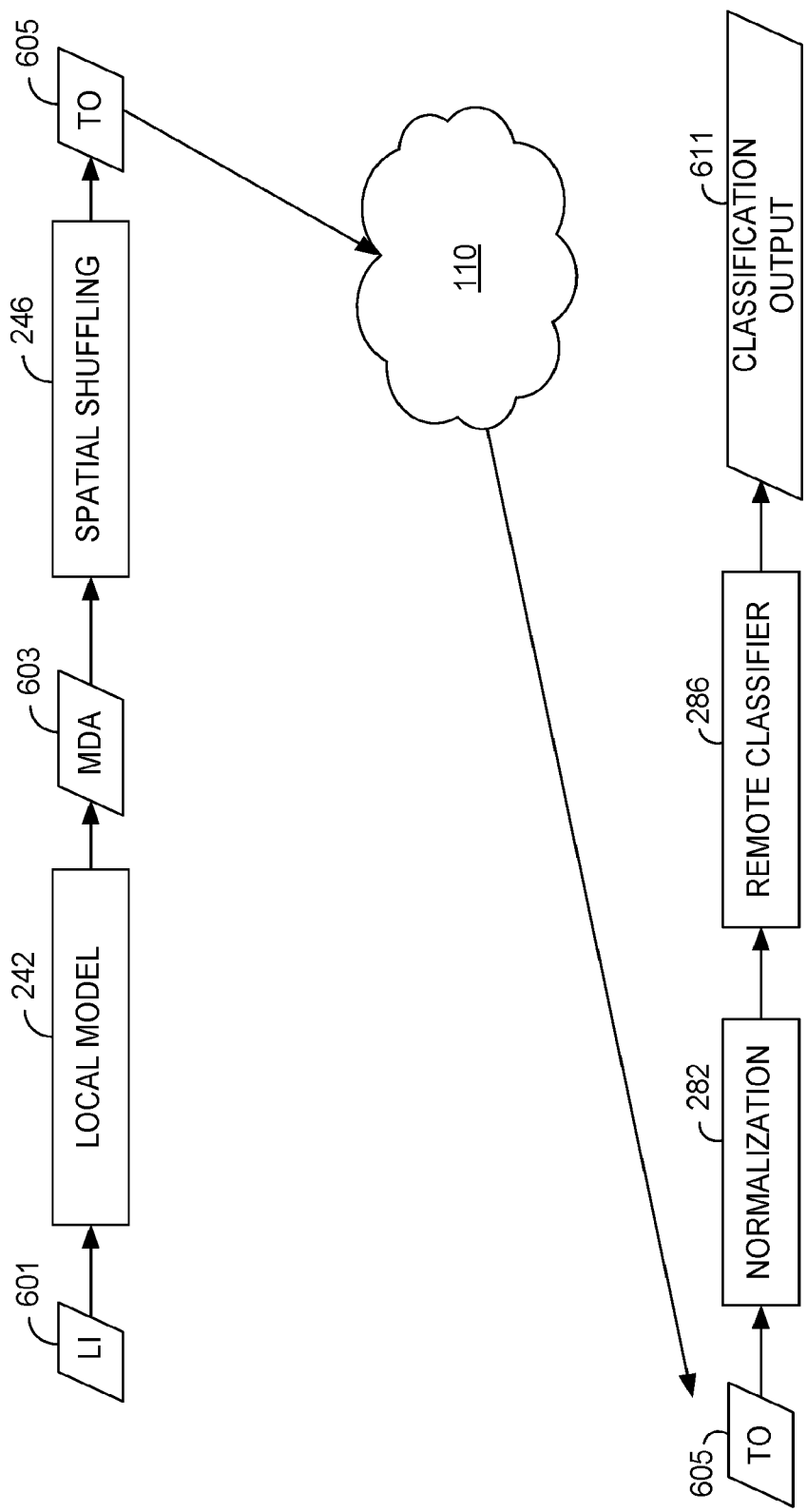
FIG. 6 is a diagram depicting classification of an image using a remote classifier that processes obfuscated image data, in accordance with an aspect of the technology described herein.

Turning now to FIG. 6, a remote classifier 286 is used to classify an image according to an aspect of the technology described herein. The classification begins by submitting unlabeled image 601 to the local model 242. The local model 242 processes the image 601 and generates a multidimensional array 603. The multidimensional array 603 is passed to the deterministic scramble component 246, which generates a transformed object 605. The transformed object 605 may have the same dimension (e.g., 7×7×512) as the last layer in the local model 242, but does not include the weights or the activation function of the last layer. Instead, the transformed object 605 includes only the outputs of each neuron, while maintaining the same dimensions, but with a different spatial relationship of values than found in the multidimensional array 603.

The transformed object 605 is communicated over the network 110 to the remote computing system. In an alternative aspect, the transformed object 605 is transferred via physical data storage, such as a USB memory stick. The transformed object 605 may go through the normalization process described previously. Once the data from the normalized transformed object 605 is received by neurons in the input layer of the remote classifier, the remote classifier 286 operates as described previously to generate a classification 611 for the image 601. In one aspect, the classification is the highest score of a classification distribution of classes being classified. The classification may be communicated to the local computing system.

Figure 7:
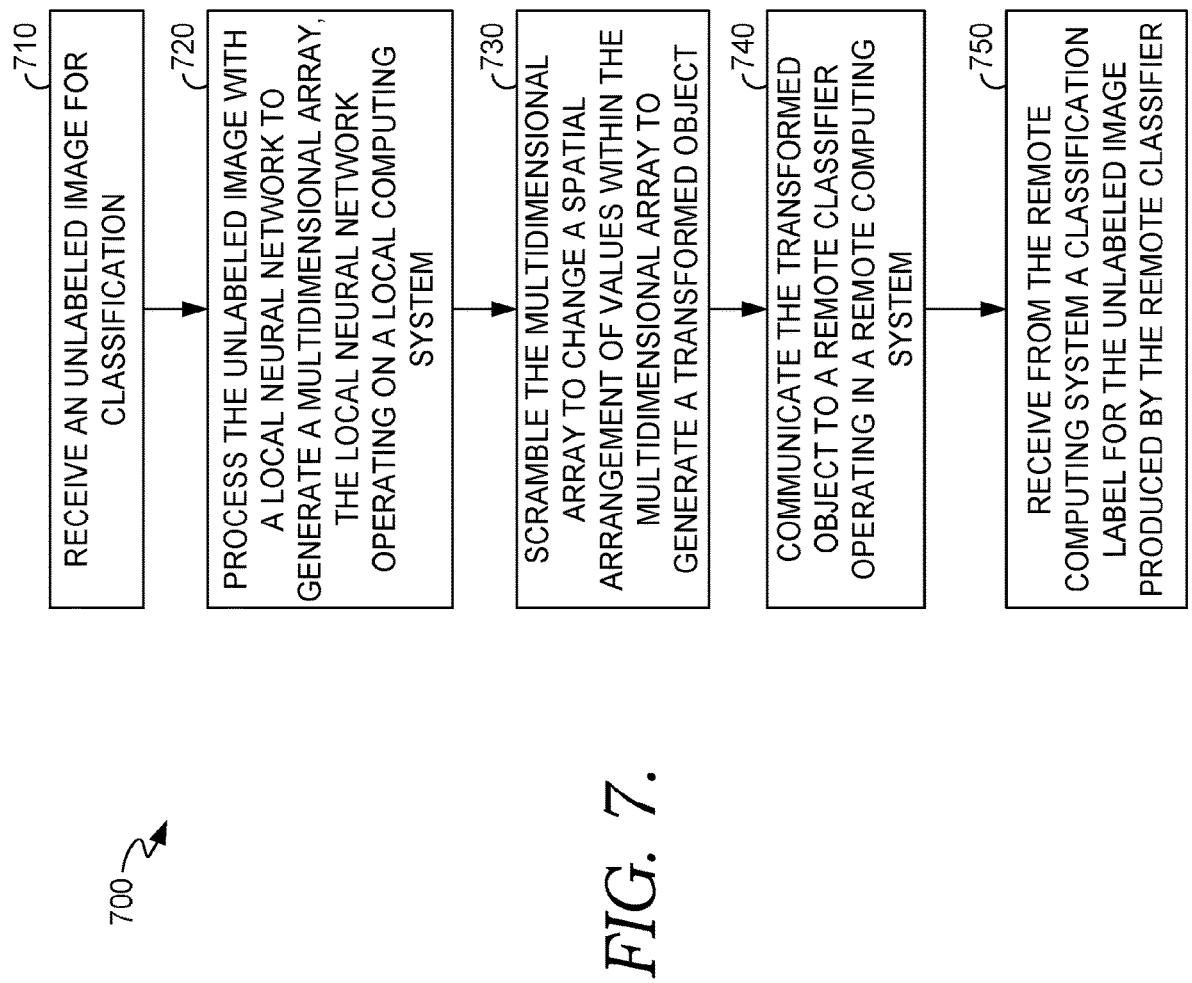
FIG. 7 depicts a flow diagram of a method for obfuscating image content, in accordance with an aspect of the technology described herein.

Turning now to FIG. 7, a flow chart showing a method 700 of obfuscating image content is provided. At step 710, an unlabeled image is received for classification by a local neural network. The unlabeled image may be a digital image containing a visual depiction of an object or objects to be classified. The image is unlabeled from the perspective of a local neural network because any label associated with the image is not communicated to the local neural network. An unlabeled image may be contrasted with a labeled image used for training. A labeled image is often viewed by a person who adds labels to the image describing objects depicted in the image. The unlabeled image may be associated with meta-data, including various labels, but if any classification has been made it is not communicated to the local neural network.

At step 720, the unlabeled image is processed by the local neural network to generate a multidimensional array. The local neural network comprises one or more layers operating on a local computing system, for example, as described previously with reference to FIGS. 2-5. In one aspect, the local neural network comprises an input layer and one or more convolutional layers.

At step 730, the multidimensional array is deterministic scrambled to change a spatial arrangement of values within the multidimensional array to generate a transformed object, as described previously with reference to FIG. 4. As mentioned, the shuffling operation is performed by a shuffling algorithm that takes a seed as input. When the same seed is used, the same shuffling operation will occur each time. Aspects of the technology described herein, use the same seed with each image to cause the same shuffling operation to be used.

The multidimensional array partially obfuscates the unlabeled image because the image cannot be reproduced with reasonable accuracy from the multidimensional array. As described with reference to FIG. 3, the operations within a convolutional layer take a group of pixels (or data representing pixels) from a receptive area and perform a calculation that may result in a single number that may describe a presence or absence of a feature, but cannot be used to reproduce the pixels in the receptive area, especially since it is combined with a weighting value. Even if the activation function and weights used to generate the neuron output were known (and they are not included in the multidimensional array or transformed object), it would still be difficult to reverse engineer the pixels in the receptive area as different arrangements of pixels may conceivably produce the same output number from a neuron. This means multiple pixel arrangements that fit the output could exist, making it impossible to ascertain the correct arrangement with reasonable accuracy.

The random shuffling operation further obfuscates the unlabeled image because spatial relationships between the model outputs and the original image are destroyed. A typical CNN model will maintain the spatial relationship of image input segments throughout the analysis. For example, a 3×3 pixel section of an image will be input to a first neuron in the input layer. An adjacent 3×3 pixel section of an image is typically input into an adjacent second neuron in the input layer. This is overall spatial arrangement is maintained through max pooling layers and other operational layers. The shuffling operation destroys the spatial arrangement of outputs so that outputs generated from adjacent image sections are no longer adjacent to each other in the transformed object. The shuffling of output data between slices of the multidimensional array further obfuscates the image.

The transformed object has the same dimension (e.g., 7×7×512) as the multidimensional array and the layer from which the multidimensional array was output, but does not include the weights or the activation function used by the neurons (e.g., the filter operation). Instead, the multidimensional array includes the outputs of each neuron in a layer, while maintaining the correct dimensions and spatial relationship between outputs. The transformed object includes all of the same data as the multidimensional array, but with different spatial relationships. Data in the transformed object may be processed by the receiving layer in a remote classifier.

At step 740, the transformed object is communicated to a remote classifier operating in a remote computing system. The transformed object is then processed by the remote classifier to generate a classification for the unlabeled image. The remote classifier can be a neural network that includes convolutional layers, pooling layers, and fully connected layers. The transformed object may be normalized, as described with reference to FIG. 2, on the local computing system prior to communication. In another aspect, the transformed object is normalized upon receipt in the remote computing system.

At step 750, a classification label for the unlabeled image produced by the remote classifier is received from the remote computing system. The classification is then associated with the unlabeled image by the local computing system. The local computing system may save the classification in associated with the image. In an aspect, a user is automatically alerted when an image with certain classifications are identified. For example, a batch of images may be classified. An alert may be generated and communicated via text, email, or some other method each time one of the images in the batch is classified into a category of interest. In one aspect, the local computing systems saves the images meeting one or more classifications into a particular data storage location. In one aspect, a report is generated showing how many images were classified into particular classes. The report can include links to images by class.

Figure 8:
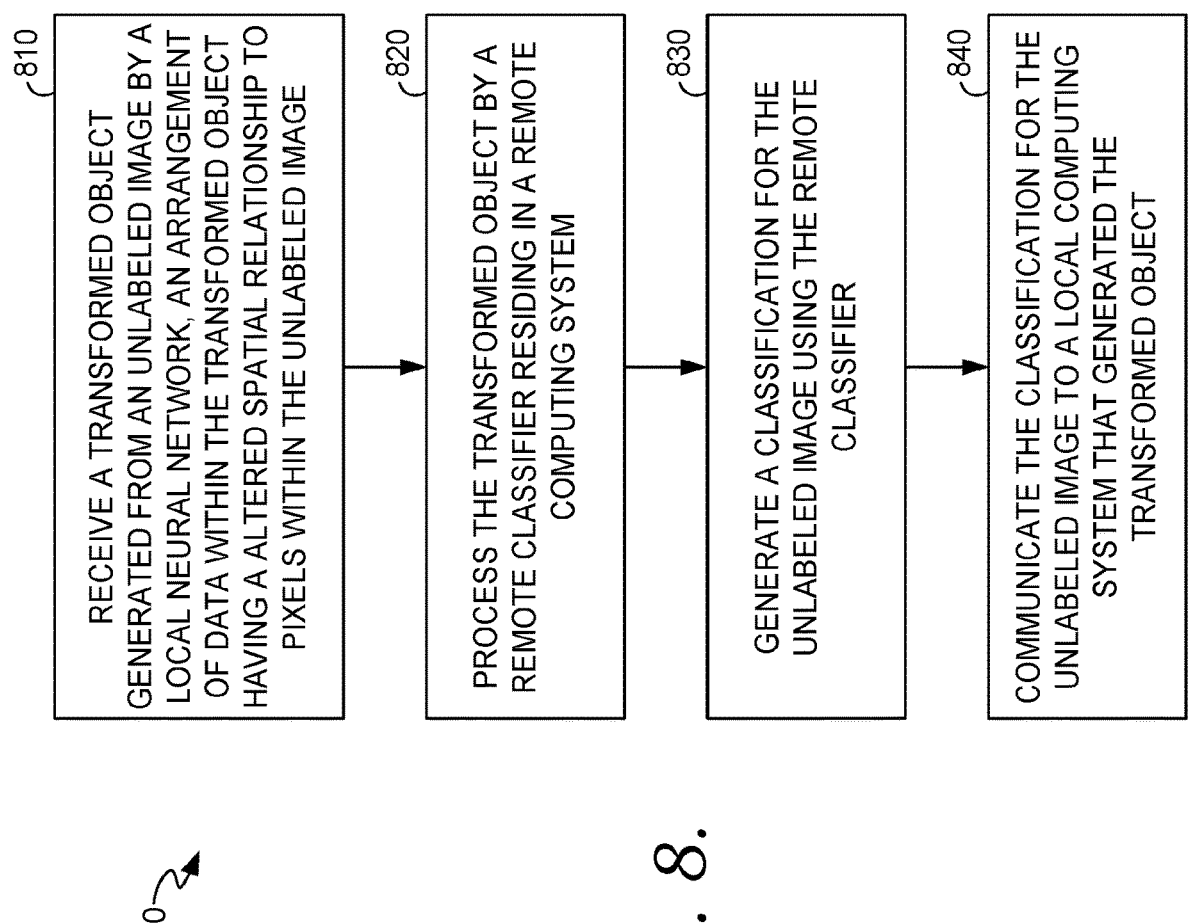
FIG. 8 depicts a flow diagram of a method for obfuscating image content, in accordance with an aspect of the technology described herein.

Turning now to FIG. 8, a flow chart showing a method 800 of obfuscating image content is provided. At step 810, a transformed object is received. The transformed object is generated from an unlabeled image generated by feeding the unlabeled image to a local neural network. The spatial arrangement of data within the transformed object has a randomly generated spatial relationship to pixels within the unlabeled image. The randomly generated spatial relationship to pixels can be generated through a deterministic scramble operation, as described previously.

The transformed object effectively obfuscates the unlabeled image because the image cannot be reproduced with reasonable accuracy from the transformed object. The transformed object has the same dimension (e.g., 7×7×512) as the layer from which the multidimensional array used to generated the transformed object was output, but does not include the weights or the activation function used by the neurons (e.g., the filter operation). Instead, the transformed object includes the outputs of each neuron in a layer, while maintaining the correct dimensions, but with a random shuffling of spatial locations. Data in the transformed object may be processed by the receiving layer as it would normally be processed if received directly from the convolutional layer.

The transformed object may be normalized, as described with reference to FIG. 2, on the local computing system prior to communication. In another aspect, the transformed object is normalized upon receipt in the remote computing system.

At step 820, the transformed object is processed by a remote classifier residing in a remote computing system, as described previously with reference to FIGS. 2-6. The remote classifier can be a neural network that includes convolutional layers, pooling layers, and fully connected layers. The transformed object is not unscrambled before processing by the remote classifier. As used herein, unscrambled means restoring the values within the transformed object to the spatial locations the objects were in within the multidimensional array used to generate the transformed object.

At step 830, a classification is generated for the unlabeled image using the remote classifier, as described previously with reference to FIG. 6.

At step 840, the classification for the unlabeled image is communicated to a local computing system that generated the transformed object, as described previously with reference to FIG. 6. The local computing system may save the classification in associated with the image. In an aspect, a user is automatically alerted when an image with certain classifications are identified. For example, a batch of images may be classified. An alert may be generated and communicated via text, email, or some other method each time one of the images in the batch is classified into a category of interest. In one aspect, the local computing systems saves the images meeting one or more classifications into a particular data storage location. In one aspect, a report is generated showing how many images were classified into particular classes. The report can include links to images by class.

Figure 9:
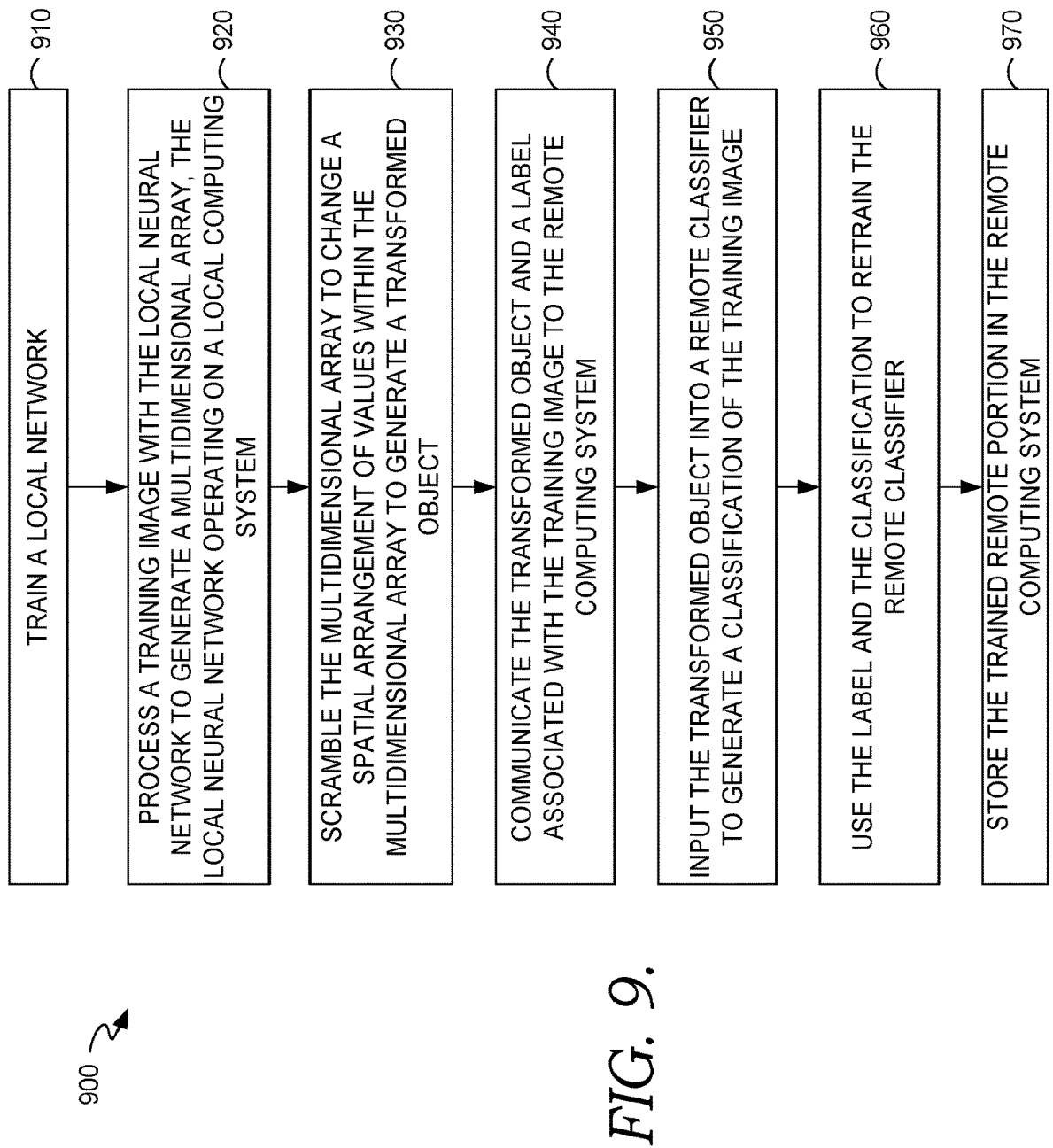
FIG. 9 depicts a flow diagram of a method for obfuscating image content, in accordance with an aspect of the technology described herein.

Turning now to FIG. 9, a flow chart showing a method 900 of obfuscating image content is provided. At step 9010, a local neural network is trained in a remote computing system using analogous training data to form local neural network, as described previously with reference to FIGS. 3 and 5.

At step 920, a training image is processed with the local neural network to generate a multidimensional array. The local neural network operates on a local computing system.

At step 930, the multidimensional array deterministic scrambles a spatial arrangement of values within the multidimensional array to generate a transformed object, as described with reference to FIG. 4.

At step 940, the transformed object and a label associated with the training image are communicated to the remote computing system, as described previously with reference to FIGS. 4-6. The transformed object may be normalized, as described with reference to FIG. 2, on the local computing system prior to communication. In another aspect, the transformed object is normalized upon receipt in the remote computing system.

At step 950, the transformed object is input into a remote classifier to generate a classification of the training image, as described previously with reference to FIG. 5. The remote classifier can be a neural network that includes convolutional layers, pooling layers, and fully connected layers. The transformed object is not unscrambled before processing by the remote classifier. As used herein, unscrambled means restoring the values within the transformed object to the spatial locations the objects were in within the multidimensional array used to generate the transformed object.

At step 960, the label and the classification are used to retrain the remote classifier, as described previously with reference to FIG. 5.

At step 970, the trained remote classifier is stored in the remote computing system. The trained remote classifier may then be used to classify unlabeled images in response to receiving a transformed object from a local system, as described previously with reference to FIG. 6.

Exemplary Operating Environment

Figure 10:
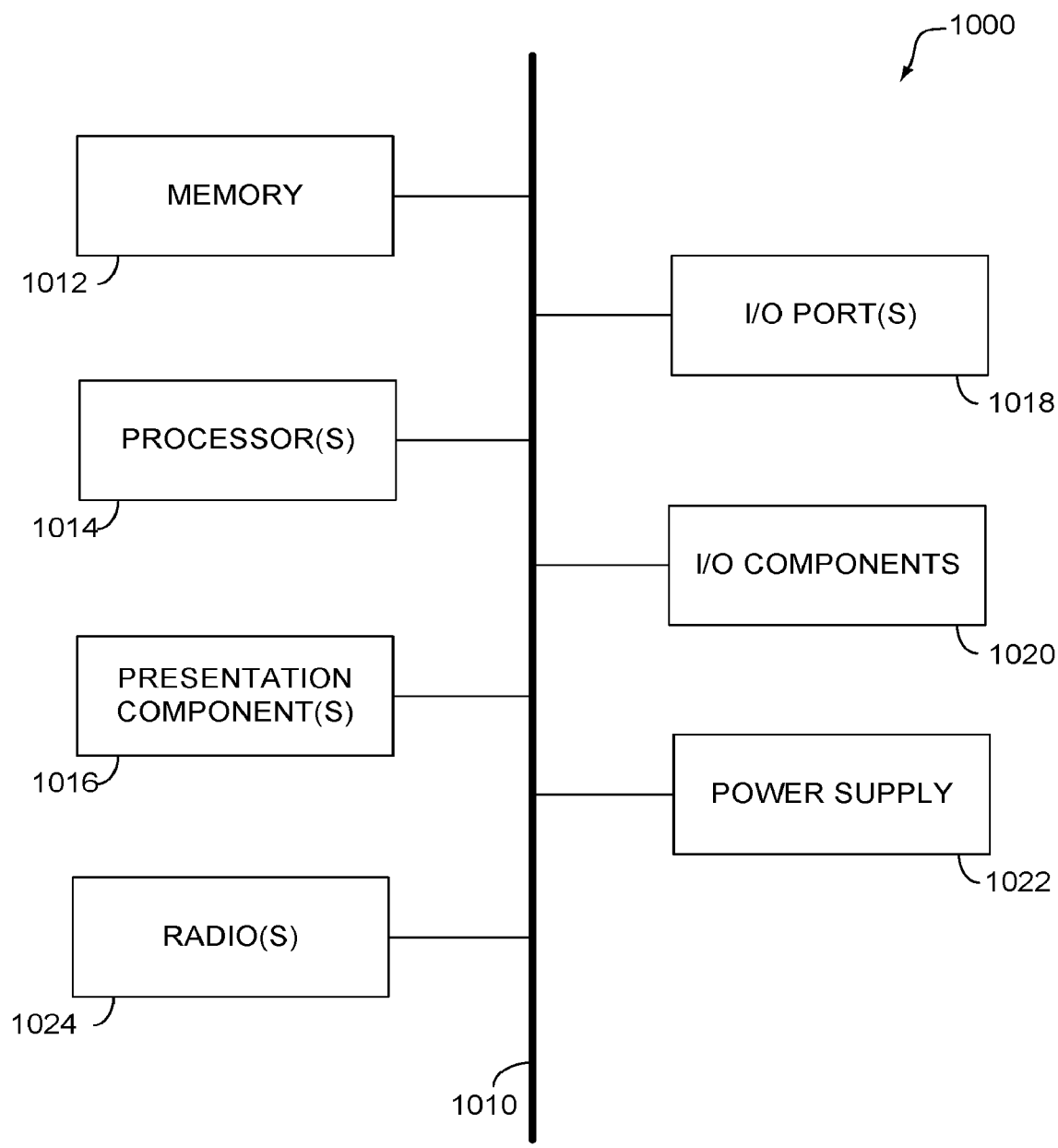
FIG. 10 is a block diagram of an exemplary computing environment suitable for use in implementing an aspect of the technology described herein.

Referring to the drawings in general, and to FIG. 10 in particular, an exemplary operating environment for implementing aspects of the technology described herein is shown and designated generally as computing device 1000. Computing device 1000 is but one example of a suitable computing environment and is not intended to suggest any limitation as to the scope of use of the technology described herein. Neither should the computing device 1000 be interpreted as having any dependency or requirement relating to any one or combination of components illustrated.

The technology described herein may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. The technology described herein may be practiced in a variety of system configurations, including remote computing system based servers, handheld devices, consumer electronics, general-purpose computers, specialty computing devices, etc. Aspects of the technology described herein may also be practiced in distributed computing environments where tasks are performed by remote-processing devices that are linked through a communications network.

With continued reference to FIG. 10, computing device 1000 includes a bus 1010 that directly or indirectly couples the following devices: memory 1012, one or more processors 1014, one or more presentation components 1016, input/output (I/O) ports 1018, I/O components 1020, and an illustrative power supply 1022. Bus 1010 represents what may be one or more busses (such as an address bus, data bus, or a combination thereof). Although the various blocks of FIG. 10 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 10 is merely illustrative of an exemplary computing device that may be used in connection with one or more aspects of the technology described herein. Distinction is not made between such categories as "workstation," "server," "laptop," "handheld device," etc., as all are contemplated within the scope of FIG. 10 and refer to "computer" or "computing device."

Computing device 1000 typically includes a variety of computer-readable media. Computer-readable media may be any available media that may be accessed by computing device 1000 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 1012 includes computer storage media in the form of volatile and/or nonvolatile memory. The memory 1012 may be removable, non-removable, or a combination thereof. Exemplary memory includes solid-state memory, hard drives, optical-disc drives, etc. Computing device 1000 includes one or more processors 1014 that read data from various entities such as bus 1010, memory 1012, or I/O components 1020. Presentation component(s) 1016 present data indications to a user or other device. Exemplary presentation components 1016 include a display device, speaker, printing component, vibrating component, etc. I/O ports 1018 allow computing device 1000 to be logically coupled to other devices, including I/O components 1020, some of which may be built in.

Illustrative I/O components include a microphone, joystick, game pad, satellite dish, scanner, printer, display device, wireless device, a controller (such as a stylus, a keyboard, and a mouse), a natural user interface (NUI), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 1014 may be direct or via a coupling utilizing a serial port, parallel port, and/or other interface and/or system bus known in the art. Furthermore, the digitizer input component may be a component separated from an output component such as a display device, or in some aspects, the useable input area of a digitizer may coexist with the display area of a display device, be integrated with the display device, or may exist as a separate device overlaying or otherwise appended to a display device. Any and all such variations, and any combination thereof, are contemplated to be within the scope of aspects of the technology described herein.

An NUI processes air gestures, voice, or other physiological inputs generated by a user. Appropriate NUI inputs may be interpreted as ink strokes for presentation in association with the computing device 1000. These requests may be transmitted to the appropriate network element for further processing. An NUI implements any combination of speech recognition, touch and stylus recognition, facial recognition, biometric recognition, gesture recognition both on screen and adjacent to the screen, air gestures, head and eye tracking, and touch recognition associated with displays on the computing device 1000. The computing device 1000 may be equipped with depth cameras, such as stereoscopic camera systems, infrared camera systems, RGB camera systems, and combinations of these, for gesture detection and recognition. Additionally, the computing device 1000 may be equipped with accelerometers or gyroscopes that enable detection of motion. The output of the accelerometers or gyroscopes may be provided to the display of the computing device 1000 to render immersive augmented reality or virtual reality.

A computing device may include a radio 1024. The radio 1024 transmits and receives radio communications. The computing device may be a wireless terminal adapted to receive communications and media over various wireless networks. Computing device 1000 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

Many different arrangements of the various components depicted, as well as components not shown, are possible without departing from the scope of the claims below. Aspects of the present technology have been described with the intent to be illustrative rather than restrictive. Alternative aspects will become apparent to readers of this disclosure after and because of reading it. Alternative means of implementing the aforementioned may be completed without departing from the scope of the claims below. Certain features and sub-combinations are of utility and may be employed without reference to other features and sub-combinations and are contemplated within the scope of the claims.

What is claimed is:

1. A method of obfuscating image content comprising:
   receiving an image;
   processing the image with a local neural network to generate an array, the local neural network operating on a local computing system;
   scrambling the array deterministically to change a spatial arrangement of values within the array to generate a transformed object;
   communicating the transformed object to a remote classifier operating in a remote computing system;
   receiving at the local computing system a classification for the image produced by the remote classifier; and
   saving, at the local computing system, the classification in association with the image.

2. The method of claim 1, wherein the scrambling uses an undisclosed seed to govern a movement of the values within the array.

3. The method of claim 2, wherein the undisclosed seed is not communicated to the remote classifier.

4. The method of claim 1, herein the remote classification model is trained on transformed objects generated by the local neural network processing labeled training images.

5. The method of claim 1, wherein the local neural network comprises a convolutional pooling layer.

6. The method of claim 5, wherein the transformed object comprises an output from each neuron in the convolutional pooling layer.

7. The method of claim 1, wherein the local neural network does not assign a classification to an image.

8. A method for obfuscating image content comprising:
   receiving, at a remote classifier, a transformed object with a spatial arrangement of data that is different from a spatial pixel arrangement in an image used to generate the transformed object;
   processing the transformed object by the remote classifier residing in a remote computing system;
   generating a classification for the image using the remote classifier; and
   communicating the classification for the image to a local computing system that generated the transformed object.

9. The method of claim 8, wherein the transformed object comprises an output from each neuron of a layer in the local neural network.

10. The method of claim 8, wherein the altered spatial relationship to pixels within the image is generated using a deterministic scramble function that produces a unique spatial rearrangement in response to receiving a seed value as input.

11. The method of claim 10, wherein the remote the seed value is not available to the remote classifier.

12. The method of claim 10, wherein the transformed object is not unscrambled before processing by the remote classifier.

13. The method of claim 9, wherein the layer is a convolutional pooling layer.

14. The method of claim 8, wherein the image, the transformed object, and the classification are all associated with a common identification.

15. The method of claim 8, wherein the remote classifier is trained using transformed objects received from the local neural network.

16. A computer-storage media having computer-executable instructions embodied thereon that when executed by a computer processor causes a mobile computing device to perform a method of obfuscating image content comprising, the method comprising:

training a local neural network;

processing a training image with the local neural network to generate an array, the local neural network operating on a local computing system;

shuffling the array to change a spatial arrangement of values within the array to generate a transformed object;

communicating the transformed object and a label associated with the training image to a remote computing system;

inputting the transformed object into a remote classifier to generate a classification of the training image;

using the label and the classification to retrain the remote classifier to form a trained remote classifier; and storing the trained remote classifier in the remote computing system.

17. The media of claim 16, wherein the transformed object comprises an output from each neuron of a layer of the local neural network.

18. The media of claim 16, wherein the transformed object is not unscrambled before processing by the remote classifier.

19. The media of claim 16, wherein the spatial arrangement of values is changed using a deterministic scramble function that produces a unique spatial rearrangement in response to receiving a seed value as input.

20. The media of claim 19, wherein the remote the seed value is not available to the remote classifier.

* * * * *